Patented Nov. 26, 1940

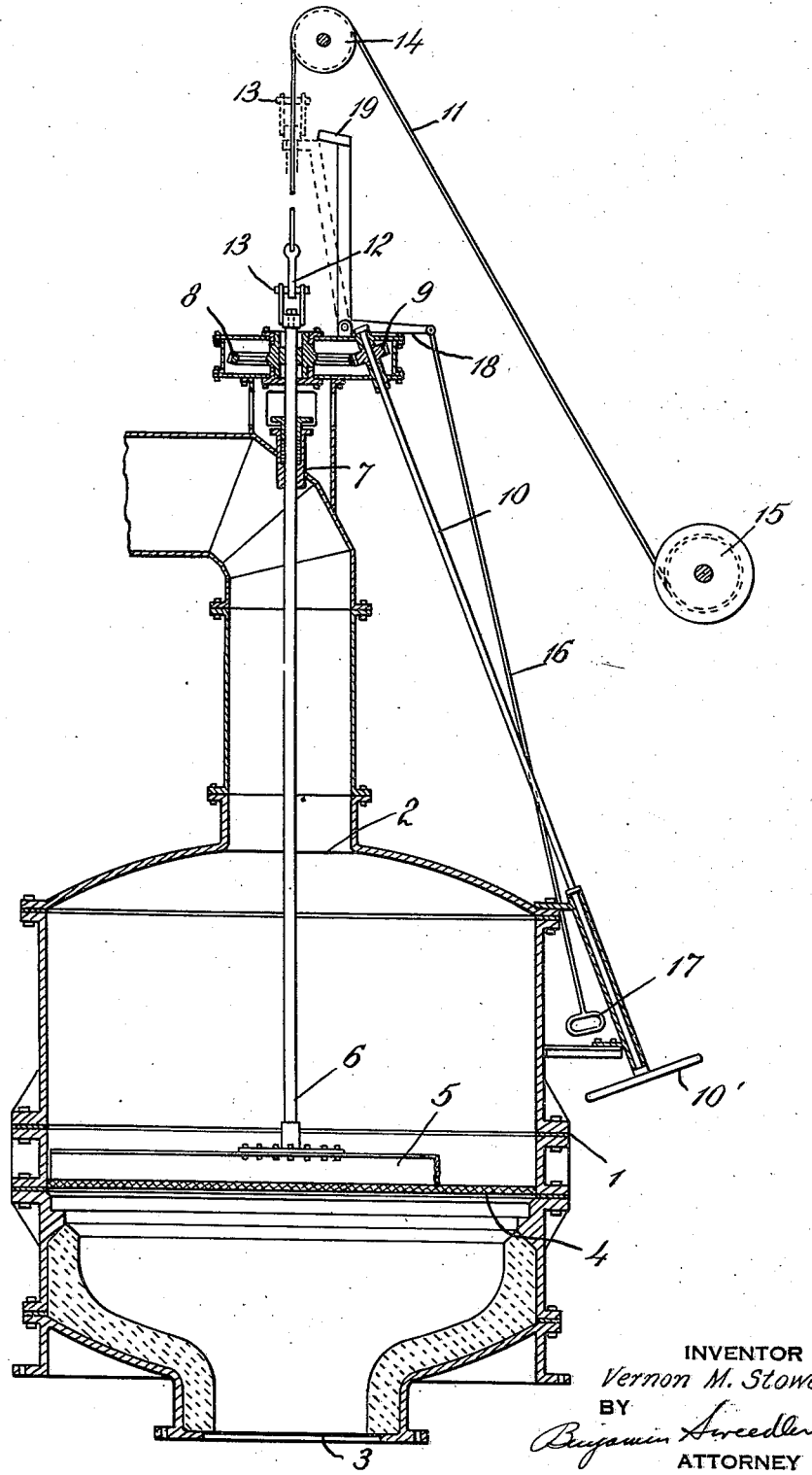

2,222,884

UNITED STATES PATENT OFFICE 2,222,884

METHOD OF RESTORING EFFICIENCY OF THIN BEDS OF CATALYST GRANULES USED FOR OXIDATION OF AMMONIA

Vernon M. Stowe, Prince George County, Va., assignor to The Solvay Process Company, New York, N. Y., a corporation of New York Application December 27, 1939, Serial No. 311,133

4 Claims. (Cl. 23—162)

This invention relates to the catalytic oxidation of ammonia.

It is well known to oxidize ammonia to form oxides of nitrogen by passing ammonia and air over catalyst granules such, for example, as the cobalt oxide catalyst disclosed in United States Patent 1,919,005 of July 18, 1933, arranged in beds a few inches deep (not more than about twelve inches) and several feet in diameter. In the operation of such catalyst converters it is found that the catalyst becomes less and less efficient as operation continues. This decline in catalytic efficiency has been generally ascribed to loss of catalyst activity and it has heretofore been found necessary at numerous intervals to interrupt the operation of the converters, open them, and replace the catalyst or add fresh catalyst so as to restore the oxidation efficiency. The cost of this method of restoring the oxidation efficiency of the converters obviously is high, particularly since it involves interruption of the operation of the converters with consequent diminution of their effective capacity.

I have made the surprising discovery that decline in catalytic efficiency of thin beds of ammonia oxidation catalyst as hereinabove described is a small and almost negligible factor in so far as further use of the catalyst is concerned, and that, contrary to what those skilled in the art would expect to be the case, the catalytic efficiency of such catalyst beds can be restored to their original efficiency whenever the catalyst bed begins to show a substantial decline in efficiency by rearranging, preferably during the continued flow of air or other oxygen-containing gas and ammonia through the bed, the catalyst granules or particles in the upper surface of the bed so as to cause a substantially uniform distribution of the catalyst granules throughout the bed and to produce a bed of substantially uniform resistance to flow therethrough. This rearrangement of the catalyst may, for example, be accomplished by moving a member, which for convenience may be termed a "rake," into contact with the catalyst granules on the surface of the bed and rotating this member so as to form a small mound of granules in front of it, which mound is pushed over the surface of the bed by the rotation of the rake member. During the rotation the rake is gradually raised, resulting in an even distribution of the accumulated mound of catalyst over the surface of the bed to produce a bed which throughout its extent offers substantially the same resistance to the flow of air and ammonia therethrough.

The rake member may be disposed in the upper portion of the converter above the thin bed of catalyst granules, which portion is at a lower temperature than that prevailing in or near the bed. Whenever it becomes necessary to dress the bed, for example, whenever there occurs a relatively slight but persistent drop in oxidation efficiency, the rake member may be lowered into the bed and operated as hereinabove described to dress the bed. Such dressing of the bed may take place at successive periods of from one to thirty days; such dressing at intervals of once or twice a week has been found to maintain the catalyst at maximum efficiency.

In plant use, sixteen months' commercial operation of a converter in accordance with my invention has taken place without once interrupting the operation to dress the catalyst bed or to replace the catalyst granules with fresh granules. During this period the rake member has been operated as hereinabove described twenty-four times without interrupting the operation of the converter, the efficiency of the catalyst in the converter having thus been restored after each treatment to about its original level for new catalyst. The advantages of and results accomplished by my invention are indeed surprising, particularly when consideration is given to the fact that prior to my invention it has been possible to restore the catalytic efficiency of the converters only by replacing part or all of the catalyst bed with newly processed catalyst, requiring interruption of the operation of the converter at intervals at times as frequent as fifteen days.

A possible explanation for the unexpected and surprising results obtained by the present invention is given below; it will be understood that this explanation is not intended to limit the invention but is advanced for the purpose of facilitating a better understanding thereof.

In operation of a catalyst converter containing thin beds of catalyst granules such as cobalt oxide granules, due to unequal thermal expansion of the oxidizer walls, the grate bars, the screen, and the catalyst bed itself, thin areas develop in the bed. Frequently, sharp depressions or cracks in the catalyst bed extending in a circle from the periphery thereof are noted. Eddy currents in the incoming gas passing through the bed may also cause thin areas to develop. Iron rust and other solid impurities are carried into the catalyst bed by the gas stream. If they remain in the catalyst bed, considerable harm results, because a relatively small amount of such impurities can completely cover the surface of the granules and render them inactive. Other impurities, either gaseous or liquid, which at times reach the catalyst bed, cause dark areas to develop and allow unoxidized ammonia to pass through the bed.

The rearrangement of the catalyst particles in accordance with my invention, i. e. by causing a member to rotate over the surface of the bed of granules pushing a mound of granules before it and during the continued rotation gradually raising this member so as to uniformly distribute the granules over the bed, this rearrangement of the granules preferably, but not necessarily, taking place during the passage of the ammonia-air stream through the bed, heals the cracks and thin areas so that the gas stream is compelled to pass through the full bed. Furthermore, the movement imparted to the granules during the full flow of gases passing through the bed permits the dislodgment of iron rust and other impurities and effects their removal from the bed. Moreover, the rearrangement of the catalyst granules presents fresh surfaces to the gas stream; the granules in the dark areas are intimately mixed with live glowing granules which allows volatile impurities such as sulfur to be burned and revivifies the dark granules to a condition such that they are effective to catalyze the oxidation of ammonia.

It will be noted that this invention possesses the important advantage of restoring the efficiency of the catalyst converters while the converters are in full operation so that there is no loss in production, or while flow of air and ammonia through the converters are interrupted momentarily without opening the converter or waiting for it to cool by radiation so that the loss in production is small. Furthermore, as the invention eliminates the necessity for shutting down and starting up the converters, it eliminates thermal stress on the converter and associated equipment due to periodic cooling and heating of this equipment involved in shutting it down and then again starting it up.

The invention may be used in the oxidation of ammonia by passing it over cobalt oxide catalyst disposed in thin beds in catalyst converters operated at about atmospheric pressure or, if desired, at superatmospheric pressures, for example, pressures up to 15 atmospheres.

For purposes of exemplification, a preferred form of apparatus for carrying out the process of this invention is shown in the accompanying drawing, in which the single figure is a vertical section through a converter containing a thin bed of catalyst granules equipped with a rake member in accordance with this invention.

In the drawing, reference character 1 indicates a converter which may be of conventional type, provided with a gas inlet 2 and a gas outlet 3. A grate or other suitable support is disposed in the converter for supporting a thin bed of catalyst granules 4 such as the cobalt oxide granules of the aforementioned patent.

A rake member or beam 5, preferably in the form of an angle iron and extending from one side of the converter to the other, is mounted on a shaft 6, which is coaxial with the axis of the converter. Shaft 6 passes through gas-tight stuffing 7 and has keyed thereon or otherwise secured thereto a driving gear 8. This gear meshes with a gear 9 keyed on one end of shaft 10, the other end of which has fixed thereto a hand wheel 10' by means of which rotation of the rake or beam can be effected. The rake or beam can be moved within the converter from the top of the converter, where the temperature is lower than at or near the catalyst bed, to a position shown in full lines to engage the catalyst bed, by means of a chain 11 having a hook 12 for engaging member 13 fixed to the top of shaft 6. Chain 11 passes over a sheave 14 and may be operated manually by rotating drum 15 to which the chain is fastened or by a suitable motor to raise and lower the rake member 5.

A release rod 16 is provided for operating a rake shaft lock to maintain the rake in its elevated position when it is not being used to dress the bed. Release rod 16 is constituted of a rod having hand-engaging portion 17 at one end and the other end pivoted to one end of a bell crank 18. The other end of the bell crank is secured to an arm 19, which is adapted to engage member 13 secured to shaft 6 and hold the shaft and rake member 5 in elevated position. Movement of the release rod 16 so as to rock the bell crank into the full line position shown in the drawing, releases engagement between arm 19 and member 13, permitting descent of the rake member into position to engage the catalyst bed.

In operation, when it becomes necessary to dress the bed the rake member is lowered until it makes contact with the catalyst granules and is then rotated so as to produce a small mound of catalyst granules in front of the rake, which mound is pushed by the rake over the surface of the catalyst bed. During the continued rotation of the rake member it is gradually raised to evenly distribute the accumulated mound of catalyst granules over the surface of the bed. This results in the exposure of fresh catalyst surfaces to gases and the production of a thin bed of substantially uniform density; in the preferred operation involving the full flow of air or other oxygen-containing gas and ammonia through the bed of catalyst, the removal of impurities from the bed is also accomplished. When the dressing of the bed has been completed, the rake is drawn up into the cool zone near the roof of the catalyst converter.

It is to be understood that this invention is not restricted to the present disclosure otherwise than defined by the appended claims.

What is claimed is:

1. The method of restoring the efficiency of a thin bed of catalyst granules employed as catalyst for the oxidation of ammonia, involving the passage of ammonia and oxygen-containing gas through the bed, which method comprises rearranging the granules in the top surface portion of the said bed to expose a fresh surface of granules to the ammonia and oxygen-containing gas and to eliminate cracks and thin zones from the said bed.

2. The method of restoring the efficiency of a thin bed of catalyst granules employed as catalyst for the oxidation of ammonia in a catalyst converter, involving the passage of ammonia and oxygen-containing gas through the bed in the converter, which method comprises rearranging the granules in the top surface portion of the said bed without opening the converter or waiting for it to cool to expose a fresh surface of granules along the top surface portion of the said bed and to eliminate cracks and thin zones from the said bed.

3. The method of restoring the efficiency of a thin bed of cobalt oxide catalyst granules employed as catalyst for the oxidation of ammonia, involving the passage of ammonia and air through the bed, which method comprises rearranging the cobalt oxide granules in the top surface portion of the said bed during the continued flow of air and ammonia therethrough to expose a fresh surface of cobalt oxide granules to the air and ammonia and to eliminate cracks and thin zones from said bed, said rearrangement being effected as soon as a small but persistent drop in oxidation efficiency of the cobalt oxide catalyst takes place.

4. The method of restoring the efficiency of a thin bed of cobalt oxide granules employed for the oxidation of ammonia, involving the passage of ammonia and air through the said bed, which method comprises moving a member into contact with said bed during the continued flow of air and ammonia therethrough and rotating this member so as to produce a small mound of cobalt oxide granules in front of the member, which mound is pushed by the member during its rotation over the surface of the bed, and while rotating this member gradually raising it so as to uniformly distribute said mound of catalyst granules over the surface of the bed to produce a bed which is substantially free of cracks and thin zones.

VERNON M. STOWE.